US011708067B2

(12) United States Patent
Sugano

(10) Patent No.: US 11,708,067 B2
(45) Date of Patent: Jul. 25, 2023

(54) MANAGEMENT CONTROLLER FOR AUTOMATED VALET PARKING SERVICE, SERVICE PROVIDING METHOD, AND SERVICE UTILIZING VEHICLE

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 122 days.

(21) Appl. No.: 17/230,193

(22) Filed: Apr. 14, 2021

(65) Prior Publication Data

US 2021/0331665 A1 Oct. 28, 2021

(30) Foreign Application Priority Data

Apr. 28, 2020 (JP) .................................. 2020-079323

(51) Int. Cl.
*B60W 30/06* (2006.01)
*B60H 1/00* (2006.01)
*G08G 1/14* (2006.01)

(52) U.S. Cl.
CPC ......... *B60W 30/06* (2013.01); *B60H 1/00964* (2013.01); *G08G 1/141* (2013.01); *B60W 2555/20* (2020.02)

(58) Field of Classification Search
CPC .............. B60W 30/06; B60W 2555/20; B60H 1/00964; G08G 1/141
See application file for complete search history.

(56) References Cited

U.S. PATENT DOCUMENTS

| 2006/0046684 | A1 | 3/2006 | Kameyama |
| 2009/0265046 | A1 | 10/2009 | Sekiyama et al. |
| 2017/0323565 | A1 | 11/2017 | Nordbruch et al. |
| 2019/0176570 | A1 | 6/2019 | Hori |
| 2020/0307558 | A1* | 10/2020 | Noguchi .............. G05D 1/0212 |
| 2021/0171020 | A1* | 6/2021 | Sugano .............. B62D 15/0285 |
| 2021/0291813 | A1* | 9/2021 | Shimamoto ........... G06Q 10/02 |
| 2021/0291858 | A1* | 9/2021 | Noguchi ............... B60W 60/00 |
| 2021/0300338 | A1* | 9/2021 | Shimamoto ........... B60W 30/06 |

(Continued)

FOREIGN PATENT DOCUMENTS

| CN | 109955675 A | 10/2020 |
| CN | 112428787 A * | 3/2021 |

(Continued)

*Primary Examiner* — Peter D Nolan
*Assistant Examiner* — Demetra R Smith-Stewart
(74) *Attorney, Agent, or Firm* — Dinsmore & Shohl LLP

(57) ABSTRACT

A management controller manages an automated valet parking service in which a vehicle travels autonomously to enter or exit a designated parking position in a parking lot having a plurality of parking positions. The management controller acquires the designated parking position of a service utilizing vehicle parked by the automated valet parking service. The management controller acquires a scheduled exit time of the service utilizing vehicle. The management controller determines a start timing of an air conditioner of the service utilizing vehicle based on the designated parking position and the scheduled exit time, and The management controller instructs the service utilizing vehicle to start the air conditioner at the start timing.

8 Claims, 9 Drawing Sheets

(56) References Cited

U.S. PATENT DOCUMENTS

| | | | |
|---|---|---|---|
| 2021/0302978 A1* | 9/2021 | Noguchi | ............ B62D 15/0285 |
| 2021/0303002 A1* | 9/2021 | Shimamoto | ............ G08G 1/146 |

FOREIGN PATENT DOCUMENTS

| | | | | | |
|---|---|---|---|---|---|
| CN | 110696587 | A | | 6/2021 | |
| JP | 2006-069296 | A | | 3/2006 | |
| JP | 2008-037215 | A | | 2/2008 | |
| JP | 2009-101927 | A | | 5/2009 | |
| JP | 2011-148325 | A | | 8/2011 | |
| JP | 2015-020494 | A | | 2/2015 | |
| JP | 2015-219811 | A | | 12/2015 | |
| JP | 6342076 | B2 | | 6/2018 | |
| JP | 2018160087 | A | * | 10/2018 | ............ H01J 29/073 |
| JP | 2019-102021 | A | | 6/2019 | |

* cited by examiner

| PARKING POSITIONS | SUNSHINE CONDITIONS |
|---|---|
| P1 | RANK 1 |
| P2 | RANK 2 |
| P3 | RANK 3 |
| ... | .. |
| ... | .. |
| ... | .. |

FIG. 3

| PARKING POSITIONS | SUNSHINE CONDITIONS / TIME ZONE (HOUR) | | | | |
|---|---|---|---|---|---|
| | 7-9 | 9-11 | 11-15 | 15-17 | 17-19 |
| P1 | RANK 2 | RANK 2 | RANK 2 | RANK 2 | RANK 1 |
| P2 | RANK 1 | RANK 3 | RANK 3 | RANK 3 | RANK 2 |
| P3 | RANK 1 | RANK 1 | RANK 1 | RANK 1 | RANK 1 |
| ... | .. | .. | .. | .. | .. |

FIG. 7

| PARKING POSITIONS | WEATHER CONDITIONS | | | | |
|---|---|---|---|---|---|
| | SUNNY | CLOUDY | RAINY | .. | .. |
| P1 | RANK 1 | RANK 2 | RANK 2 | ... | ... |
| P2 | RANK 1 | RANK 3 | RANK 3 | ... | ... |
| .. | RANK 1 | RANK 1 | RANK 1 | ... | ... |
| ... | .. | .. | .. | ... | ... |

*FIG. 9*

MANAGEMENT CONTROLLER FOR AUTOMATED VALET PARKING SERVICE, SERVICE PROVIDING METHOD, AND SERVICE UTILIZING VEHICLE

CROSS-REFERENCE TO RELATED APPLICATION

The present application claims priority under 35 U.S.C. § 119 to Japanese Patent Application No. 2020-079323, filed Apr. 28, 2020, the contents of which application are incorporated herein by reference in their entirety.

BACKGROUND

Field

The present disclosure relates to a management controller for an automated valet parking (AVP) service in a parking lot, a service providing method, and a service utilizing vehicle.

Background Art

Patent No. JP 6342076 discloses a technique related to an automated valet parking service in a parking lot. In this technique, a parking lot management server for a parking lot receives an inquiry about the implementation of at least one vehicle-specific service for the vehicle in the parking lot and judges whether the inquiry can be performed. If the judgement is positive, planning and coordination of the implementation of the service is carried out. The vehicle-specific services are exemplified by vehicle cleaning, filling of fuel tank in vehicles, storage of electrical energy storage, performing inspections, performing repairs, performing tire replacement, etc.

SUMMARY

In automated valet parking, service users do not know their parking positions because the entering vehicles move from a pick-up and drop-off area to parking positions by autonomous traveling of the vehicles. Therefore, depending on the parking position of the vehicle, the temperature inside the cabin of the parked vehicle may change to a temperature that is beyond the expectation of the service user. In this case, service users who boarded the exiting vehicle may feel uncomfortable.

It is an object of the present disclosure to provide a management controller for an automated valet parking service, a service providing method, and a service utilizing vehicle, which can prevent a service user using the automated valet parking service from feeling uncomfortable at the cabin temperature at the time of exiting the vehicle.

In order to solve the above-mentioned problems, the first disclosure is applied to a management controller for an automated valet parking service, in which a vehicle travels autonomously to enter or exit a designated parking position in a parking lot having a plurality of parking positions. The management controller includes at least one processor, and at least one memory including at least one program. The at least one program included in the at least one memory is executed by the at least one processor to cause the at least one processor to execute first processing of acquiring the designated parking position of a service utilizing vehicle parked by the automated valet parking service, second processing of acquiring a scheduled exit time of the service utilizing vehicle, third processing of determining a start timing of an air conditioner of the service utilizing vehicle based on the designated parking position and the scheduled exit time, and fourth processing of instructing the service utilizing vehicle to start the air conditioner at the start timing.

The second disclosure has the following features in the first disclosure.

The at least one program causes the at least one processor to acquire sunshine information associating a sunshine condition with each of the plurality of parking positions. The at least one program causes the at least one processor to, in the third processing, determine the start timing based on the sunshine information corresponding to the designated parking position.

The third disclosure has the following features in the second disclosure.

In the sunshine information, the sunshine condition is associated with each of the plurality of parking positions for each time zone.

The fourth disclosure has the following features in the first disclosure.

The at least one program causes the at least one processor to acquire a facility environment condition of the parking lot in a time zone in which the automated valet parking service is utilized and, acquire facility environment information associating the facility environment condition with each of the plurality of parking positions. The at least one program causes the at least one processor to, in the third processing, determining the start timing based on the facility environment information corresponding to the designated parking position.

The fifth disclosure has the following features in the fourth disclosure.

The facility environment condition includes a weather condition.

Further, in order to solve the above-mentioned problems, the sixth disclosure is applied to a service providing method for an automated valet parking service, in which a vehicle travels autonomously to enter or exit a designated parking position in a parking lot having a plurality of parking positions. The service providing method includes first processing of acquiring a parking position of a service utilizing vehicle parked by the automated valet parking service, second processing of acquiring a scheduled exit time of the service utilizing vehicle, third processing of determining a start timing of an air conditioner of the service utilizing vehicle based on the designated parking position and the scheduled exit time, and fourth processing of starting the air conditioner of the service utilizing vehicle at a start timing.

The seventh disclosure has the following features in the sixth disclosure.

The third processing includes specifying a sunshine condition corresponding to the designated parking position based on the sunshine information in which the sunshine condition is associated with each of the plurality of parking positions, and determining the start timing based on the sunshine condition which is specified from the sunshine information.

Further, in order to solve the above-mentioned problem, the eighth disclose is applied to a service utilizing vehicle that utilizes an automated valet parking service, in which a vehicle travels autonomously to enter or exit a designated parking position in a parking lot having a plurality of parking positions. When utilizing the automated valet parking service, the service utilizing vehicle is configured to travel autonomously to the designated parking position, and start an air conditioner at a start timing of the air conditioner of the service utilizing vehicle determined based on a scheduled exit time and the designated parking position.

According to the first or sixth disclosure, it is possible to determine the start timing of the air conditioning in the cabin of the service utilizing vehicle in accordance with the location condition and the scheduled exit time for each parking position. Thus, it is possible to prevent service users board the service utilizing vehicle from feeling uncomfortable about the cabin temperature. As a result, the convenience of the automated valet parking service is enhanced.

Specifically, according to the second or seventh disclosure, the start timing of the air conditioner is determined on the basis of the sunshine condition associated with the designated parking position. Thus, it is possible to reflect the sunshine condition for each parking position which is greatly related to the temperature rise in the vehicle cabin in the decision of the starting timing.

According to the third disclosure, in the sunshine information, the sunshine condition is associated with each of a plurality of parking positions for each time zone. According to such a configuration, it is possible to reflect the sunshine condition that changes according to the time zone in the sunshine information.

Further, according to the fourth or fifth disclosure, the start timing of the air conditioner is determined based on the facility environment information in the time zone in which the automated valet parking service is used. As a result, the actual facility environment information in the time zone of service use can be reflected in the decision of the start timing.

According to the eighth disclosure, the service utilizing vehicle for the automated valet parking service starts the air conditioner at the start timing of the air conditioner which is determined based on the scheduled exit time and the designated parking position of the vehicle. Thus, it is possible to prevent the service user riding on the service utilizing vehicle from feeling discomfort to the cabin temperature.

BRIEF DESCRIPTION OF DRAWINGS

FIG. 3 is a diagram showing an example of sunshine information according to a first embodiment;

FIG. 7 is a diagram showing an example of a modification of the sunshine information;

FIG. 9 is a diagram showing an example of facility environment information according to the second embodiment.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment 1-1. Management System for Automated Valet Parking

Figure 1:
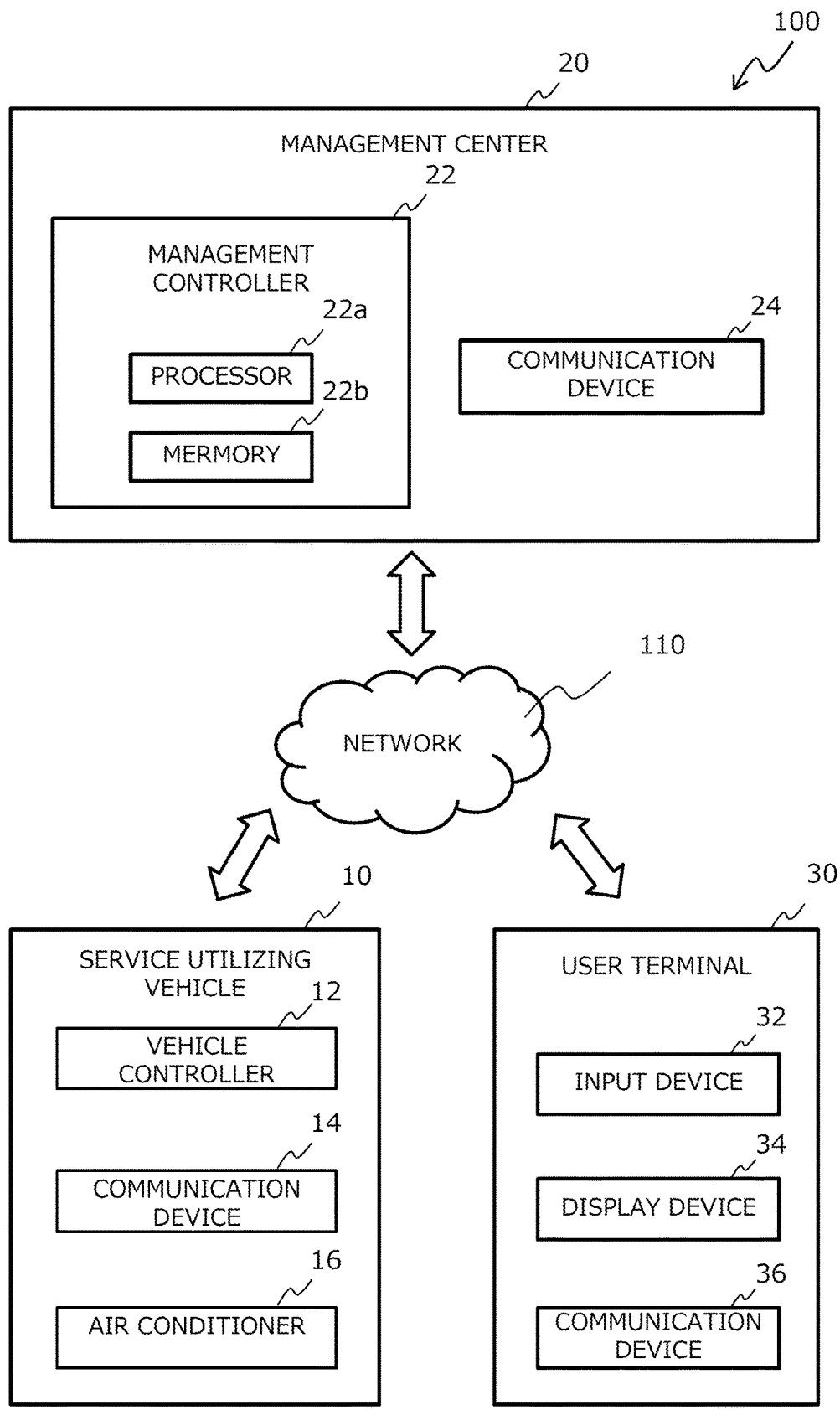
FIG. 1 is a block diagram for explaining a configuration of a management system for an automated valet parking.

FIG. 1 is a block diagram for explaining a configuration of a management system for an automated valet parking. A management system 100 of the present embodiment is a system for managing an automated valet parking service that realizes a movement of a travel route between a pick-up and drop-off area and a designated parking position by autonomous travel of the vehicle. The management system 100 includes a service utilizing vehicle 10, a management center 20, and a user terminal 30.

The service utilizing vehicle 10 is a vehicle that supports the automated valet parking service. The service utilizing vehicle 10 is an autonomous traveling vehicle capable of autonomously traveling a route between at least a pick-up and drop-off area and a designated parking position in a parking lot that provides an automated valet parking service, based on various information. The service utilizing vehicle 10 includes a vehicle controller 12, a communication device 14 and an air conditioner 16. The vehicle controller 12 is an Electronic Control Unit (ECU) having at least one processor and at least one memory. At least one program for autonomous traveling and various data are stored in the memory. The program stored in the memory is read out and executed by the processor, whereby various functions for autonomous traveling are realized in the vehicle controller 12. The vehicle controller 12 controls the driving, steering, and braking of the vehicle to travel along a set travel route. There are various known methods for autonomous traveling, and in the present disclosure, since the autonomous traveling method itself is not limited, a detailed description thereof will be omitted.

The air conditioner 16 is a device for adjusting the temperature of the vehicle cabin of the service utilizing vehicle 10 by cooling or heating. Operation of the air conditioner 16 is controlled by the vehicle controller 12. When an instruction to start air conditioning from the vehicle controller 12 is issued, the air conditioner 16 adjusts the vehicle cabin to a set temperature.

The vehicle controller 12 is configured to connect to a network 110 using the communication device 14. The connection destination of the vehicle controller 12 on the network 110 is a management center 20 of a parking lot.

The management center 20 is, for example, a facility operated by a business operator who provides a parking lot. The management center 20 includes a management controller 22 and a communication device 24. The management controller 22 is an ECU (Electronic Control Unit) having at least one processor 22a and at least one memory 22b. The memory 22b stores at least one program and various data for the operation of the parking lot. The program stored in the memory 22b is read out and executed by the processor 22a, and various functions for operating the parking lot are realized in the ECU. The functions implemented in the management controller 22 will be described in detail later. The communication device 24 is configured to be connected to the vehicle controller 12 or the user terminal 30 of the service utilizing vehicle 10 via the network 110.

The user terminal 30 is a terminal device owned by a service user of the automated valet parking service. The user terminal 30 is associated with the service utilizing vehicle 10 used by the service user. The user terminal 30 includes at least an input device 32, a display device 34, and a communication device 36. The input device 32 is for the service user to input various information such as reservation information of the automated valet parking service. The display device 34 displays various types of information. As the input device 32 and the display device 34, for example, a touch panel display is exemplified. The user terminal 30 is configured as a wireless communication terminal that can be connected to a base station (not shown) of the network 110 using the communication device 36. The user terminal 30 is exemplified by a smart phone. An application for using the automated valet parking service is installed in the user terminal 30. By starting the application, it is configured to communicate with the management center 20 via the network 110.

1-2. Summary of Automated Valet Parking Service

Figure 2:
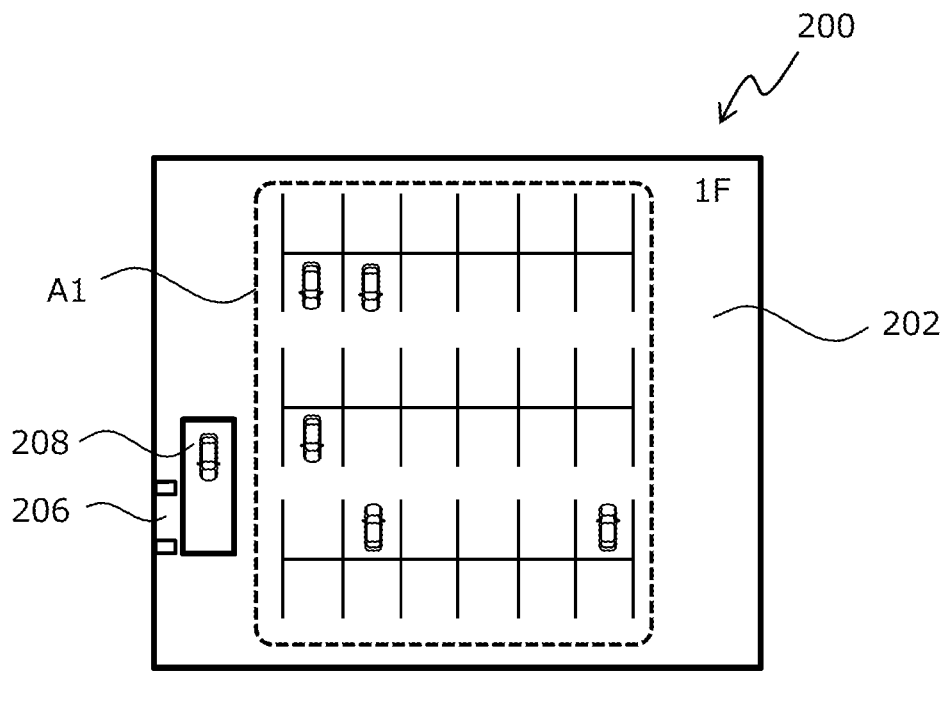
FIG. 2 is a diagram for explaining an outline of a parking lot managed by the management system according to a first embodiment.
Figure 2:
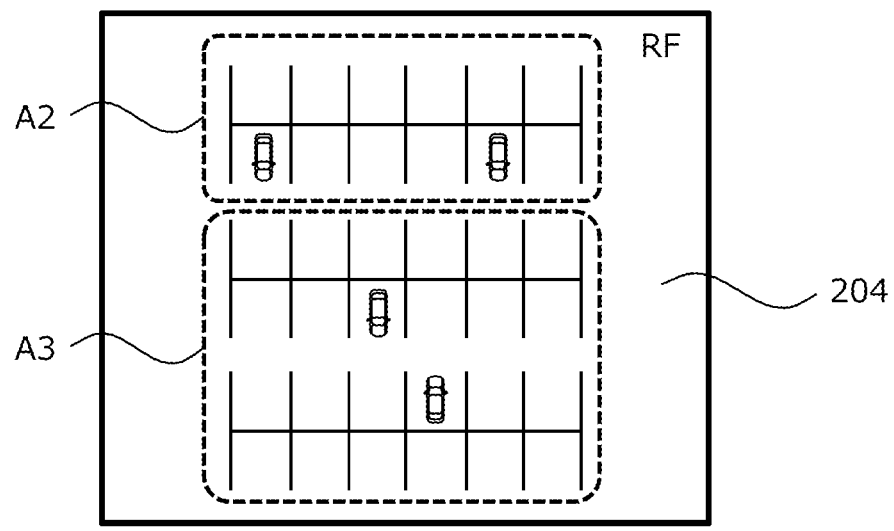

The management system 100 of the present embodiment is applied to a management system of a parking lot corresponding to an automated valet parking service. FIG. 2 is a diagram for explaining an outline of a parking lot managed by the management system according to the present embodiment. A parking lot 200 illustrated in FIG. 2 is a facility corresponding to the automated valet parking service executed by the management system 100 of the present embodiment. The parking lot 200 is a three-dimensional parking lot having, for example, a first floor (1F) 202 and a rooftop floor (RF) 204 in the room, and is adjacent to a commercial facility or the like (not shown). A plurality of parking positions are zoned in each of the first floor (1F) 202 and the rooftop floor (RF) 204.

An entrance 206 to a commercial facility or the like is provided on the first floor 202 of the parking lot 200. A pick-up and drop-off area 208 for service users of the automated valet parking is provided in the vicinity of the entrance 206.

In the automated valet parking service, the management center 20 determines a designated parking position of the service utilizing vehicle 10. Thus, the service user does not grasp a parking environment of his own vehicle. For this reason, for example, when the service utilizing vehicle 10 is parked at a designated parking position in the rooftop floor 204 having a good sunshine condition, the temperature in the vehicle cabin rises while the vehicle is parked, which may cause discomfort to the service user taking into the exiting vehicle.

The service user inputs in advance facility use information including at least a scheduled enter time and a scheduled exit time of the service utilizing vehicle 10, and transmits the facility use information to the management center 20. Therefore, the management center 20 can grasp the scheduled exit time of the service utilizing vehicle 10 using the automated valet parking service.

Therefore, in the management system 100 of the present embodiment, using the designated parking position and the scheduled exit time of the service utilizing vehicle 10, an air conditioning process of adjusting the air conditioning in the vehicle cabin prior to the exit is executed. Specifically, the management controller 22 acquires the scheduled exit time and the designated parking position of the service utilizing vehicle 10 utilizing the automated valet parking service.

Here, the ease of increasing the temperature of the vehicle cabin of the parked vehicle varies depending on the parking position in the parking lot. The management controller 22 stores a rank value representing the ease of increasing the temperature of the vehicle cabin of the parked vehicle for each parking position. Typically, the rank value for each parking position is set based on a sunshine condition for each parking position determined by the structure and location of the parking lot. The information of the rank value for each parking position set based on the sunshine condition is hereinafter referred to as "sunshine information". FIG. 3 is a diagram showing an example of sunshine information. In the sunshine information in FIG. 3, three rank values determined from the sunshine conditions are associated with each parking position.

In the sunshine information exemplifying the parking lot 200 shown in FIG. 2, for example, the rank value of the parking position included in the entire area A1 of the first floor 202 is set to "RANK 1". In the sunshine information, the rank value of the parking position included in the area A2 having a better sunshine condition than the area A1 in the rooftop floor 204 is set to "RANK 2". In the sunshine information, the rank value of the parking position included in the area A3 of the rooftop floor 204, which has a better sunshine condition than the area A2, is set to "RANK 3".

The management controller 22 stores a required operating time calculation map storing the relationship between the rank value and a required operating time of the air conditioner 16. The required operating time calculation map can be set such that, for example, the larger the rank value, that is, the better the sunshine condition, the larger the required operating time. The management controller 22 calculates the required operation time of the air conditioner 16 from the required operation time calculation map, and calculates a start timing of the air conditioner 16 by back-calculating from the scheduled exit time. In the following description, this start timing is referred to as "air conditioning start timing". The management controller 22 instructs the vehicle controller 12 of the service utilizing vehicle 10 so that the air conditioner is started at the air conditioning start timing.

According to such an operation, the vehicle cabin of the service utilizing vehicle 10 is adjusted to an appropriate temperature by the scheduled exit time. As a result, it is possible to prevent the service user who rides on the service utilizing vehicle 10 from feeling uncomfortable. Thereby, it is possible to improve the convenience of the automated valet parking service. Further, since the air conditioning is adjusted in accordance with the scheduled exit time of the service utilizing vehicle 10, it is possible to prevent deterioration of fuel consumption due to air conditioning is operated more than necessary.

Hereinafter, the detailed configuration and operation of the automated valet parking service executed by the management system 100 will be described in more detail.

1-3. Specific Configuration Example of Management Controller

Figure 4:
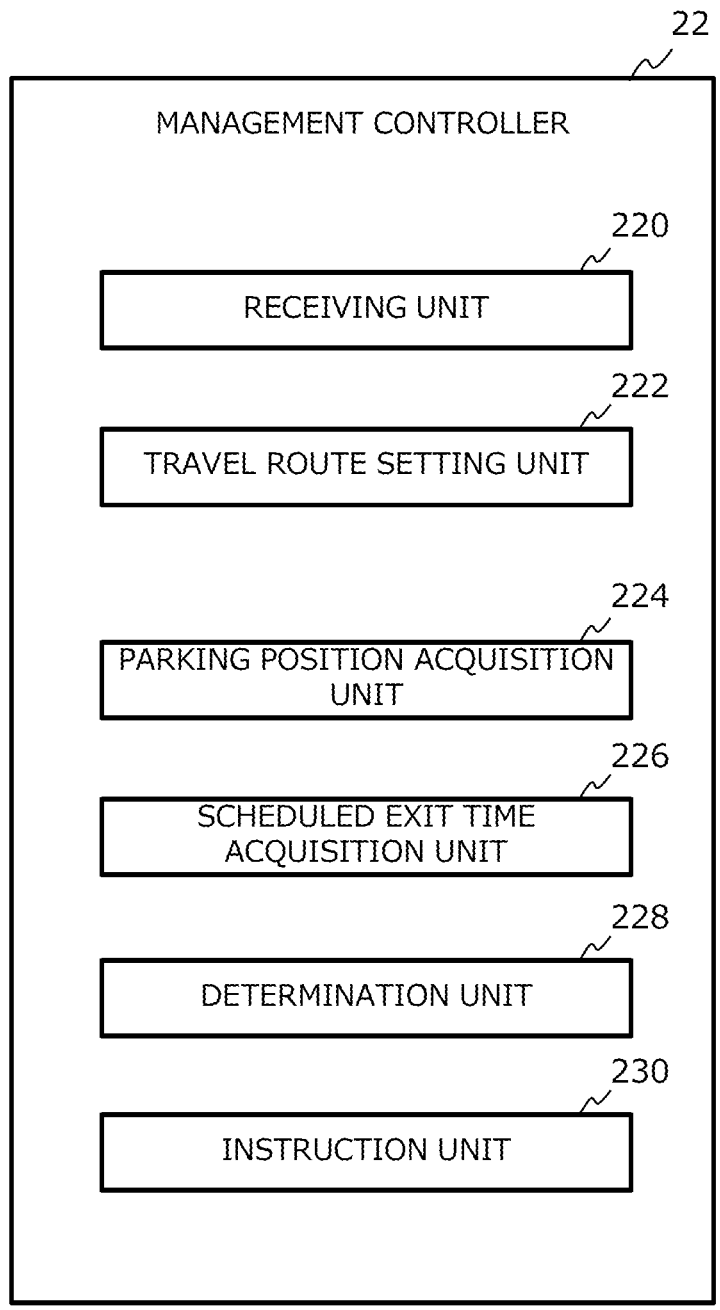
FIG. 4 is a functional block diagram for explaining a function of the management controller according to the first embodiment.

FIG. 4 is a functional block diagram for explaining functions of the management controller. As shown in FIG. 4, the management controller 22 includes a receiving unit 220 and a travel route setting unit 222 as functions for performing an entry process and an exit process of the automated valet parking service.

The receiving unit 220 receives facility use information of the service utilizing vehicle 10 using the automated valet parking. The facility use information includes, in addition to the identification information of the service utilizing vehicle 10, the scheduled enter time and the scheduled exit time of the service utilizing vehicle 10. The received facility use information is stored in the memory 22b of the management controller 22.

The travel route setting unit 222 selects the designated parking position of the service utilizing vehicle 10, sets the travel route from the pick-up and drop-off area 208 to the designated parking position. There are various known methods for selecting the designated parking position and setting the travel route. In the present disclosure, the method itself of selecting the designated parking position and setting the travel route is not limited, and therefore, the detailed description thereof is omitted.

Further, as a function for performing air conditioning process in the automated valet parking service, the management controller 22 includes a parking position acquisition unit 224, a scheduled exit time acquisition unit 226, a determination unit 228, and an instruction unit 230.

The parking position acquisition unit 224 acquires the designated parking position of the service utilizing vehicle 10 using the automated valet parking service. In the entry process in the automated valet parking service, the management controller 22 selects the designated parking position of the service utilizing vehicle 10. Here, the parking position acquisition unit 224 acquires the designated parking position selected in the entry process. The acquired designated parking position is stored in the memory 22b of the management controller 22.

The scheduled exit time acquisition unit 226 acquires the scheduled exit time of the service utilizing vehicle 10 using the automated valet parking. The scheduled exit time is included in the facility use information received from the user terminal 30. Here, the scheduled exit time acquisition unit 226 acquires the scheduled exit time included in the facility use information. The scheduled exit time is stored in the memory 22b of the management controller 22.

The determination unit 228 determines the air conditioning start timing of the service utilizing vehicle 10 based on the designated parking position and the scheduled exit time. Typically, the determination unit 228 specifies the rank value based on the designated parking position, and determines the required operating time corresponding to the rank value from the required operating time calculation map. Then, the determination unit 228 calculates the air conditioning start timing by backtracking the required operation time from the scheduled exit time.

Instruction unit 230 directions the service utilizing vehicle 10 so that the air conditioning systems of the service utilizing vehicle 10 is started at the air conditioning start timing. Here, the instruction unit 230, to the vehicle controller 12 of the service utilizing vehicle 10 when the air conditioning start timing, directions the operation start of the air conditioner.

1-4. Specifically Processing of Automated Valet Parking Service

The management system 100 provides an automated valet parking service for the service utilizing vehicle 10 by transmitting and receiving various types of information between the service utilizing vehicle 10, the management center 20, and the user terminal 30 via the network 110. In the entry process and the exit process of the automated valet parking service, the movement of the travel route between the pick-up and drop-off area and the designated parking position is realized by the autonomous travel of the service utilizing vehicle 10. The air conditioning process for the automated valet parking service improves the cabin temperature environment of the service utilizing vehicle 10 at the time of exiting by controlling the air conditioning of the service user vehicle 10 in advance according to the scheduled exit time. Hereinafter, the automated valet parking service executed by the management system 100 will be described below with reference to the flowchart.

Figure 5:
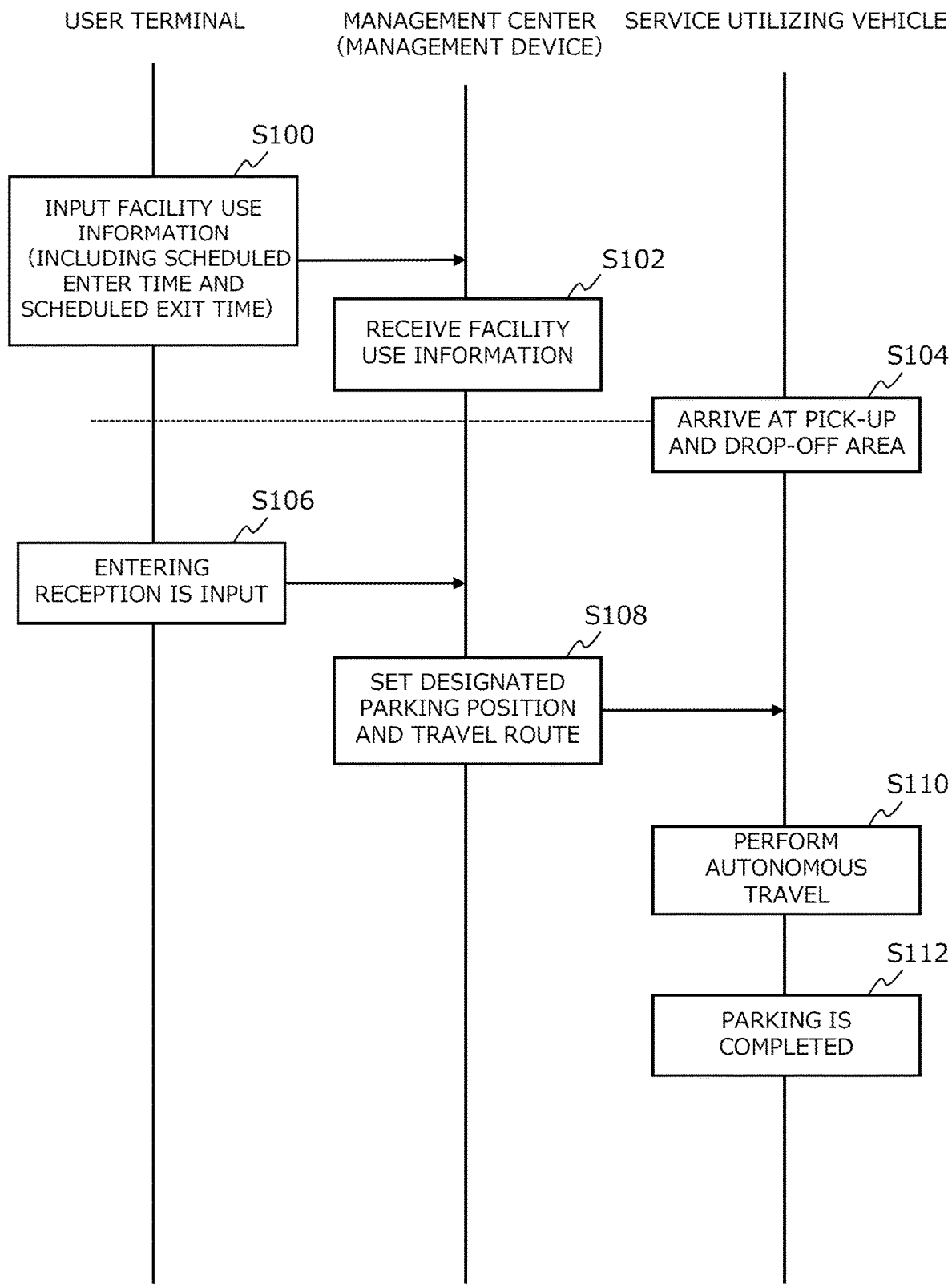
FIG. 5 is a flowchart for explaining a flow of an entry process of the automated valet parking service performed by the management system.

FIG. 5 is a flowchart for explaining a flow of an entry process of the automated valet parking service performed by the management system. First, in step S100 of the flow chart shown in FIG. 5, in the user terminal 30, the facility use information including the scheduled enter time and the scheduled exit time of the service utilizing vehicle 10 is input by the service user. The input facility use information is transmitted to the management center 20.

In step S102, the management center 20 receives the facility use information by the management controller 22. The management center 20 acquires facility management information based on the received facility use information. Here, the scheduled exit time acquisition unit 226 of the management controller 22 acquires the scheduled exit time included in the facility management information.

In step S104, when the service utilizing vehicle 10 arrives at the pick-up and drop-off area, the service user gets off the vehicle. In the following step S106, an entering reception is input from the user terminal 30 by the service user. The input entering reception is transmitted from the user terminal 30 to the management center 20.

In step S108, the management center 20 sets the designated parking position of the service utilizing vehicle 10, and the travel route from the current location to the designated parking position. The set parking position and the travel route is transmitted to the service utilizing vehicle 10.

In step S110, the vehicle controller 12 of the service-utilizing vehicle 10, using the known autonomous travel function, performs autonomous travel of the service utilizing vehicle 10 along the set travel route. Then, when the parking of the service utilizing vehicle 10 to the designated parking position is completed in step S112, the entry process in the automated valet parking service is terminated.

Figure 6:
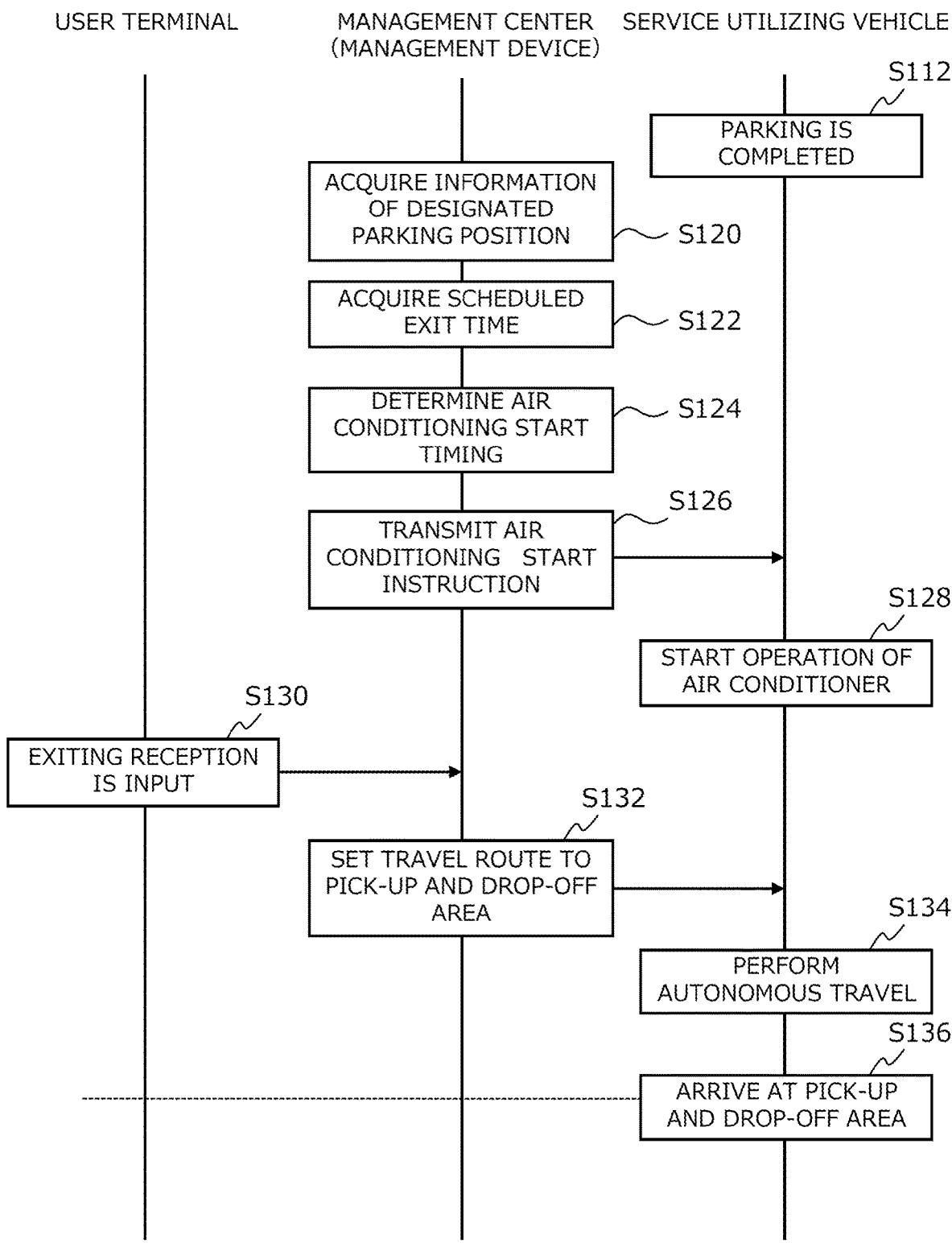
FIG. 6 is a flowchart showing a flow of an air conditioning process and an exit process of the automated valet parking service performed by the management system.

FIG. 6 is a flowchart showing a flow of the air conditioning process and the exit process of the automated valet parking service performed by the management system. When the parking of the service utilizing vehicle 10 is completed in the process of step S112, the management controller 22 acquires information of the designated parking position in the process of step S120. In the process of next step S122, the management controller 22 acquires the scheduled exit time of the service utilizing vehicle 10. In the process of next step S124, the management controller 22 determines an air conditioning start timing based on the designated parking position and the scheduled exit time.

In the process of next step S126, the management controller 22 transmits an air conditioning start instruction to the service utilizing vehicle 10 so that the operation of the air conditioner is started at the air conditioning start timing. In the process of step S128, the service utilizing vehicle 10 starts operation of the air conditioner upon receipt of the air conditioning start instruction.

In the next step S130, an exiting reception is input from the user terminal 30 by the service user. The input exiting reception is transmitted from the user terminal 30 to the management center 20.

In step S132, the management center 20 sets the travel route from the designated parking position of the service utilizing vehicle 10 to the pick-up and drop-off area. The set travel route is transmitted to the service utilizing vehicle 10.

In step S134, the vehicle controller 12 of the service utilizing vehicle 10, using the known autonomous travel function, performs autonomous travel of the service utilizing vehicle 10 along the set travel route. Then, when the service utilizing vehicle 10 arrives at the pick-up and drop-off area in step S136, the exit process in the automated valet parking service is terminated.

According to the automated valet parking service by the management system 100 configured as described above, the air conditioning in the vehicle cabin of the vehicle to be exited, can be prepared in advance in consideration of the parking environment and the scheduled exit time. This makes it possible to improve the convenience of the automated valet parking service.

In the management system 100 of the present embodiment, the management controller 22 executes the process of step S120, thereby realizing the "first processing" in the service providing method of the present disclosure. Further, the management controller 22 executes the process of step S122, thereby realizing the "second processing" in the service providing method of the present disclosure. Further, the management controller 22 executes the process of step S124, thereby realizing the "third processing" in the service providing method of the present disclosure. Then, the service utilizing vehicle 10 executes the process of step S128, thereby realizing the "fourth processing" in the service providing method of the present disclosure.

1-5. Modified Example

The management system 100 according to the first embodiment may adopt modified examples as described below.

In the management system 100 of the present embodiment, the parking lot 200 is not limited to the structure, shape, arrangement, quantity, and the like of the parking lot as long as it is a parking lot corresponding to the automated valet parking service. This modification can also be applied to a management system of another embodiment to be described later.

The management center 20 may be configured by a vehicle management center that mainly performs reservation management of an automated valet parking service, vehicle management, and the like, and a parking management center that mainly performs parking management of an automated valet parking service. In this case, the vehicle management center and the parking management center are configured to be able to communicate with each other via the network 110. The functions of the management center 20 are distributed and arranged in the vehicle management center and the parking management center. The functional arrangement of the management center 20 is not limited. Typically, the vehicle management center, among the functions of the management center 20, for example, the receiving unit 220, the parking position acquisition unit 224, the scheduled exit time acquisition unit 226, the determination unit 228 and the instruction unit 230 is arranged. In the parking lot management center, for example, the function of the travel route setting unit 222 is arranged among the functions of the management center 20. This modification can be applied to a management system of another embodiment to be described later.

The functional arrangement of the management system 100 is not limited. That is, a part of the functions of the management center 20 may be disposed in the service utilizing vehicle 10 or the user terminal 30. In this case, necessary information may be transmitted and received by communicating with each other via the network 110. This modification can also be applied to a management system of another embodiment to be described later.

The sunshine information may be set by further subdividing a rank value (sunshine condition) for each parking position into a plurality of time zones. FIG. 7 is a diagram showing an example of a modification of the sunshine information. The determination unit 228 specifies the rank value corresponding to the time zone of service use using the sunshine information shown in FIG. 7, and determines the required operation time corresponding to the rank value from the required operation time calculation map. According to such a configuration, since the sunshine condition for each time zone can be reflected in the rank value, the convenience of the automated valet parking service can be further enhanced.

The determination unit 228 may determine the required operating time corresponding to the designated parking position based on the map defining the relationship between the parking position and the required operating time. In addition to the designated parking position, the determination unit 228 may determine the required operating time by further considering the outside air temperature. In this case, the determination unit 228 may determine such that the higher the outside air temperature, the shorter the required operation time. Further, the determination unit 228 may determine the required operating time by further considering the parking time in addition to the designated parking position. In this case, the determination unit 228 may determine that the longer the parking time, the longer the required operating time.

2. Second Embodiment

Next, the management system according to the second embodiment will be described.

2-1. Configuration of Management System According to Second Embodiment

The configuration of the management system according to the second embodiment is the same as that of the management system 100 according to the first embodiment shown in FIG. 1. Therefore, a detailed description of the configuration of the management system according to the second embodiment is omitted.

2-2. Specific Configuration Example of Management Controller

Figure 8:
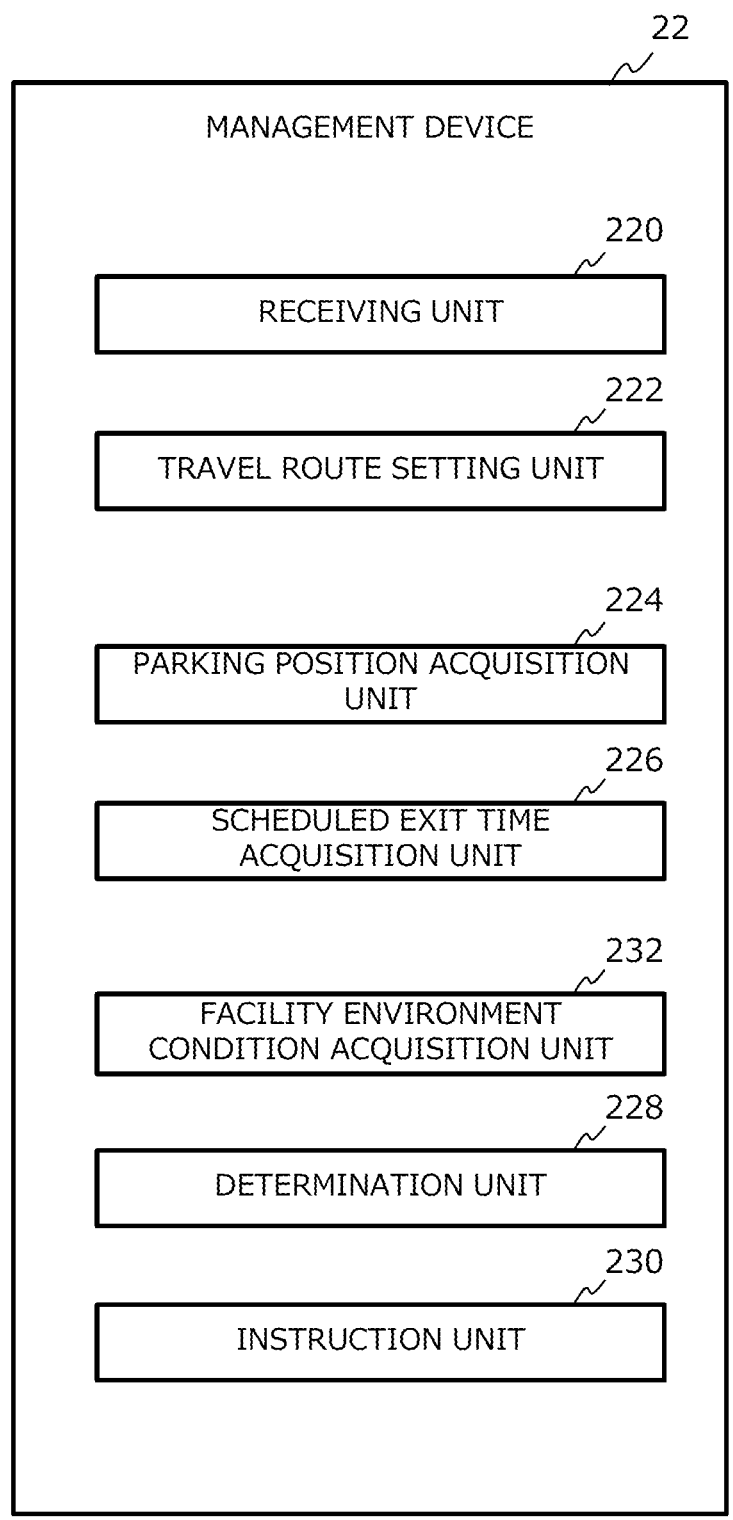
FIG. 8 is a functional block diagram for explaining a function of the management controller according to a second embodiment.

FIG. 8 is a functional block diagram for explaining the function of the management controller according to the second embodiment. As shown in FIG. 8, the management controller 22 of the second embodiment further includes a facility environment condition acquisition unit 232 for acquiring a facility environment condition of the parking lot, in addition to the configuration of the management controller 22 of the first embodiment. Typically, the facility environment conditions are exemplified by a weather condition including sunny, cloudy, rainy, wind, and the like. The facility environment condition acquisition unit 232 acquires the facility environment condition (e.g. weather condition) from the outside via the communication device 24. The acquired facility environment condition is stored in the memory 22b of the management controller 22.

2-3. Characteristic Functions of Management System According to Second Embodiment The management system 100 of this embodiment is characterized in that a rank value set based on the facility environment information is used as a rank value representing the ease with which the temperature inside the cabin of a parked vehicle rises. Typically, the facility environment information includes weather conditions in the parking lot. The weather conditions in a parking time zone affect the degree of increase in temperature in the vehicle cabin of a parked vehicle. For example, the degree of increase in temperature in the vehicle cabin in rainy weather differs between the outdoor parking position without a roof and the indoor parking position with a roof. The management controller 22 stores the rank value of the degree of increase in temperature of the vehicle cabin for each weather condition for each parking position.

The management controller 22 acquires the designated parking position of the vehicle and acquires the weather conditions of the time zone of service use. FIG. 9 is a diagram illustrating facility environmental information. The management controller 22 calculates a rank value corresponding to the acquired designated parking position and weather conditions using the facility environment information shown in FIG. 9. The management controller 22 calculates the required operation time of the air conditioner 16 corresponding to the calculated rank value from the required operation time calculation map, calculates the air conditioning start timing of the air conditioner 16 by back-calculating from the scheduled exit time. The management controller 22 instructs the vehicle controller 12 of the service utilizing vehicle so that the air conditioner is started at the air conditioning start timing.

According to the automated valet parking service by the management system 100 configured as described above, the air conditioning in the vehicle cabin of the vehicle to be exited, can be prepared in advance after considering the weather conditions of the parking time zone. This makes it possible to improve the convenience of the automated valet parking service.

2-4. Modified Example

The management system 100 according to the second embodiment may adopt modified modes as described below.

The facility environment conditions are not limited to the weather condition. That is, the facility environment conditions may be any environment conditions that affect the degree of increase in temperature inside the cabin of a parked vehicle, such as climatic conditions based on the location of the parking lot. According to such a configuration, since the condition based on the facility environment can be widely reflected in the rank value, the convenience of the automated valet parking service can be further enhanced.

The determination unit 228 may determine the required operating time corresponding to the designated parking position based on the map defining the relationship among the designated parking position, the facility management condition, and the required operating time. In addition to the designated parking position and the facility management condition, the determination unit 228 may determine the required operating time by further considering an outside air temperature. In this case, the determination unit 228 may determine such that the higher the outside air temperature, the shorter the required operation time. In addition to the designated parking position and the facility management condition, the determination unit 228 may further determine the required operating time by considering a parking time. In this case, the determination unit 228 may determine that the longer the parking time, the longer the required operating time.

What is claimed is:

1. A management controller for an automated valet parking service, in which a vehicle travels autonomously to enter or exit a designated parking position in a parking lot having a plurality of parking positions, the management controller, comprising:
at least one processor; and
at least one memory including at least one program that causes the at least one processor to execute:
first processing of acquiring the designated parking position of a service utilizing vehicle parked by the automated valet parking service,
second processing of acquiring a scheduled exit time of the service utilizing vehicle,
third processing of determining a start timing of an air conditioner of the service utilizing vehicle based on the designated parking position and the scheduled exit time, and
fourth processing of instructing the service utilizing vehicle to start the air conditioner at the start timing.

2. The management controller for the automated valet parking service according to claim 1,
wherein the at least one program causes the at least one processor to acquire sunshine information associating a sunshine condition with each of the plurality of parking positions, and
wherein the at least one program causes the at least one processor to, in the third processing, determine the start timing based on the sunshine information corresponding to the designated parking position.

3. The management controller for the automated valet parking service according to claim 2, wherein in the sunshine information, the sunshine condition is associated with each of the plurality of parking positions for each time zone.

4. The management controller for the automated valet parking service according to claim 1, wherein the at least one program causes the at least one processor to:
acquire a facility environment condition of the parking lot in a time zone in which the automated valet parking service is utilized and,
acquire facility environment information associating the facility environment condition with each of the plurality of parking positions, and
wherein the at least one program causes the at least one processor to, in the third processing, determining the start timing based on the facility environment information corresponding to the designated parking position.

5. The management controller for the automated valet parking service according to claim 4, wherein the facility environment condition includes a weather condition.

6. A service providing method for an automated valet parking service, in which a vehicle travels autonomously to enter or exit a designated parking position in a parking lot having a plurality of parking positions, the service providing method comprising:

first processing of acquiring a parking position of a service utilizing vehicle parked by the automated valet parking service;

second processing of acquiring a scheduled exit time of the service utilizing vehicle;

third processing of determining a start timing of an air conditioner of the service utilizing vehicle based on the designated parking position and the scheduled exit time; and fourth processing of starting the air conditioner of the service utilizing vehicle at a start timing.

7. The service providing method for the automated valet parking service according to claim 6, wherein the third processing includes:

specifying a sunshine condition corresponding to the designated parking position based on sunshine information in which the sunshine condition is associated with each of the plurality of parking positions, and determining the start timing based on the sunshine condition which is specified from the sunshine information.

8. A service utilizing vehicle that utilizes an automated valet parking service, in which a vehicle travels autonomously to enter or exit a designated parking position in a parking lot having a plurality of parking positions, wherein, when utilizing the automated valet parking service, the service utilizing vehicle is configured to:

travel autonomously to the designated parking position, and start an air conditioner at a start timing of the air conditioner of the service utilizing vehicle determined based on a scheduled exit time and the designated parking position.

* * * * *